3,130,222
PROCESS FOR THE PREPARATION OF ALIPHATIC BROMIDES

Arthur A. Asadorian, Midland, and George A. Burk, Bay City, Mich., assignors to The Dow Chemical Company, Midland, Mich., a corporation of Delaware
No Drawing. Filed Feb. 14, 1962, Ser. No. 173,129
5 Claims. (Cl. 260—539)

The present invention relates to aliphatic bromides and is more particularly concerned with a new and useful process for the preparation of aliphatic bromides and their phenyl and substituted phenyl derivatives from their corresponding chlorides.

The prior art methods for the production of aliphatic bromides usually employ a catalyst such as the aluminum halide type catalysts. These methods, as well as those which do not employ catalysts, have not been entirely satisfactory since side reactions such as decomposition and molecular rearrangements occur with the production of undesired products. Many of these undesired products are difficult to separate from the desired product.

It is therefore an object of the present invention to provide a process for the direct bromination of aliphatic chlorides with attendant high yields. It is another object of the present invention to provide a process from which the desired product will be obtained substantially free from undesired side-reaction products which products are difficult to separate. These and other objects will become apparent from the following specification and claims.

It has now been found that the bromination of saturated aliphatic chloro compounds including their phenyl and substituted phenyl derivatives can be readily and conveniently accomplished by the direct bromination of the appropriate chloride with hydrogen bromide in the presence of hydrobromic acid. Thus, in accordance with the present invention, an aliphatic chloride can be directly brominated to the corresponding bromide by contacting the chloride with hydrogen bromide in the presence of aqueous hydrobromic acid. The reaction proceeds smoothly at from room temperature to about the reflux temperature of the reaction mixture and preferably between about 40° and 140° C. Upon completion of the reaction the desired product may be separated by fractional distillation if a liquid, or filtration and recrystallization if a solid. It is to be understood that the hydrobromic acid may be added as such or formed in situ.

In a preferred manner of carrying out the present invention, substantially equal volumes of the appropriate chloride and aqueous 48% hydrobromic acid are mixed together at room temperature and hydrogen bromide gas passed into the resulting mixture. The reaction proceeds smoothly at temperatures from room temperature to about the reflux temperature of the reaction mixture. It is preferable to conduct the reaction with gentle stirring throughout the reaction period. Upon completion of the reaction, as evidenced by the substantial cessation of the formation of hydrogen chloride gas, the reaction mixture when containing water-insoluble products is washed with cold water, neutralized with a dilute alkali solution and dried. The resulting mixture containing either water-soluble or water-insoluble products is fractionally distilled to obtain the desired product.

It is to be understood that while the constant boiling 48% aqueous hydrobromic acid is preferred, that concentrations from about 40% to about 60% can be employed. Concentrations from about 60% to about 48% are dependent on the temperature, i.e., when the process is operated at about room temperature the concentration of the acid will be about 60%, while at about 126° C. the concentration of the acid will be about 48%. If concentrations lower than 48% are employed; say for example, about 40%, the process is operated by intermittent introduction of the HBr to bring the concentration up to the predetermined higher level, then permitting the reaction to proceed until the concentration drops to a predetermined lower level, or, the rate of introduction of the HBr is regulated so that the concentration of the acid is maintained at the desired level. These latter two procedures when employed to maintain the concentration below about 48% results in somewhat lower efficiencies in conversions and yields and usually require extended reaction periods.

The class of compounds which can be employed as starting materials are the aliphatic chlorides, that is, the chlorinated saturated hydrocarbons having at least two carbon atoms which can be substituted with phenyl and substituted phenyl radicals, and include the chloroalkanes, the phenyl chloroalkanes, the chloroalkanoic acids and the phenyl chloroalkanoic acids, it being understood that the phenyl moiety can be substituted with lower alkyl, halogen, nitro radicals, and the like. Thus, one can employ the chloroalkanes, as, for example, the chlorinated ethanes, such as, ethylene chloride, tetrachloroethane, and the like, the chlorinated propanes, butanes, pentanes, hexanes, heptanes, octanes, nonanes, decanes, undecanes, dodecanes, tridecanes, tetradecanes, penta-, hexa-, hepta-, octadecanes and the like as well as their brominated derivatives, phenyl and substituted phenyl derivatives such as α-chlorotoluene, β-chloroethylbenzene, α-chloroxylene. Further, one can employ the corresponding alkanoic acids such as chloroacetic, chloropropionic acid, phenyl chloroacetic acid and the like.

The following examples are illustrative of the present invention but are not to be construed as limiting.

*Example 1.—Trimethylene Bromide*

Hydrogen bromide gas (2050 grams; 566 liters STP) was bubbled into a mixture of one liter of trimethylene chlorobromide and one liter of aqueous 48% hydrobromic acid. The addition was carried out with stirring; at the reflux temperature (110°–115° C.); and, over a period of about 50 hours. The reaction proceeded smoothly with the evolution of hydrogen chloride gas which was vented from the reaction zone. Upon completion of the reaction, the reaction mixture was washed twice with cold water and neutralized with cold dilute $Na_2CO_3$ solution. The dried mixture analyzed 98.2% trimethylene bromide $(CH_2)_3Br_2$. Distillation gave steady boiling product in 91% yield collected at 66–67° C. at 25 mm. (166–167°/760). This distillate had a specific gravity of 1.977 at 25° C. and a refractive index of 1.5204 at 25° C.

*Example 2.—Bromoacetic Acid*

Chloroacetic acid (356 grams; 3.75 moles), dissolved in 100 cubic centimeters of an aqueous 48% hydrobromic acid solution, was heated with stirring at 70° C. until a clear solution was obtained. Hydrogen bromide [781 grams; 216 liters (STP)] gas was bubbled into the solution for 26¼ hours. Heating and stirring were continued during this period. A final pot temperature of 120° C. was reached whereat substantially all of the hydrogen chloride had been evolved by the end of the period. The resulting mixture was fractionally distilled to obtain 473 grams of a bromoacetic acid product as a crystalline residue having a melting point of 49.0° C., assaying 99.4% equivalent to Br. This product represented a 90% yield based on the chloroacetic acid employed.

*Examples 3–4*

In the manner of the foregoing examples, employing the following reactants and proportions, the following compounds were obtained in the indicated yields.

| Example No. | Starting Chloride | Amount, grams | HBr | 48% aqueous HBr, cc. | Time, hours | Temp., °C. | Product and Conversion |
|---|---|---|---|---|---|---|---|
| 3 | Dichloroacetic acid | 277 | 1539 g. (425 l., (STP) 11.9 moles). | 100 | 64½ | 100 | Dibromoacetic acid, 86%. |
| 4 | Tertiary butyl chloride | 210 | 359 g. (100 l., (STP) 4.42 moles). | 250 | 10¼ | 54–74 | Tertiary butyl bromide, 67%. |

*Example 5*

A 50 ml. volume (76.5 g.) of hydrobromic acid and 50 ml. volume (53.5 g.) of 2-chloroethylbenzene was agitated in a 500 ml. reactor and treated with anhydrous HBr gas at about 100–110° C. for 41¼ hours.

A dark emulsion was recovered, washed with water and subjected to suction filtration. There was obtained from the filtrate 40 ml. (49.5 g.) of a dark oil. This oil was treated with anhydrous $Na_2CO_3$ and $CaCl_2$ to yield an oily liquid containing 60% by weight 2-bromoethylbenzene.

We claim:

1. A process for the substitution bromination of an aliphatic chloride which comprises reacting an aliphatic chloride selected from the group consisting of chloro-alkanes having from 2 to about 18 carbon atoms, chloro-alkanoic acids having from 2 to about 18 carbon atoms, their phenyl, and lower alkylphenyl derivatives, with hydrogen bromide in the presence of aqueous hydrobromic acid having a concentration of acid of at least about 40% at a temperature of from about room temperature to about 140° C.

2. A process for the preparation of lower bromo-alkanoic acids which comprises reacting the corresponding chloro-alkanoic acid with hydrogen bromide in the presence of hydrobromic acid at a temperature of from about 70° to about 140° C.

3. A process for the preparation of lower bromo-alkanes which comprises reacting the corresponding chloro-alkane with hydrogen bromide in the presence of hydrobromic acid at a temperature of from about 40° to about 140° C.

4. A process for the preparation of α-bromoxylene which comprises reacting α-chloroxylene with hydrogen bromide in the presence of hydrobromic acid at a temperature of from about 70° to about 140° C.

5. A process for the preparation of α-bromotoluene which comprises reacting α-chlorotoluene with hydrogen bromide in the presence of hydrobromic acid at a temperature of from about 70° to about 140° C.

References Cited in the file of this patent

UNITED STATES PATENTS 2,553,518   Lake _____ May 15, 1951
2,729,607   Sterling _____ Jan. 3, 1956

OTHER REFERENCES

Perkman: Catalysis, pages 656–657 (1940).